United States Patent
Morgan et al.

(10) Patent No.: US 8,581,711 B2
(45) Date of Patent: Nov. 12, 2013

(54) METHODS AND SYSTEMS OF RULE-BASED INTOXICATING SUBSTANCE TESTING ASSOCIATED WITH VEHICLES

(75) Inventors: Gerald A. Morgan, Littleton, CO (US); Christopher M. Macheca, Centennial, CO (US); Amy E. Rossetter, Indialantic, FL (US); Stanley G. Schwarz, Indialantic, FL (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 335 days.

(21) Appl. No.: 13/069,145

(22) Filed: Mar. 22, 2011

(65) Prior Publication Data

US 2012/0242469 A1 Sep. 27, 2012

(51) Int. Cl.
*B60R 25/10* (2013.01)
(52) U.S. Cl.
USPC .................................................. 340/426.11
(58) Field of Classification Search
USPC .............. 340/426.11, 426.24, 576, 426.19, 340/539.1; 180/272
See application file for complete search history.

(56) References Cited

U.S. PATENT DOCUMENTS

| | | | |
|---|---|---|---|
| 4,335,370 A | | 6/1982 | Scalley et al. |
| 4,592,443 A | * | 6/1986 | Simon ........................... 180/272 |
| 4,624,578 A | | 11/1986 | Green |
| 4,688,026 A | | 8/1987 | Scribner et al. |
| 4,700,296 A | | 10/1987 | Palmer, Jr. et al. |
| 4,738,333 A | * | 4/1988 | Collier et al. ................. 180/272 |
| 4,800,590 A | | 1/1989 | Vaughan |
| 5,014,206 A | | 5/1991 | Scribner et al. |
| 5,132,968 A | | 7/1992 | Cephus |
| 5,228,083 A | | 7/1993 | Lozowick et al. |
| 5,426,415 A | * | 6/1995 | Prachar et al. ................ 340/576 |
| 5,490,200 A | | 2/1996 | Snyder et al. |
| 5,495,531 A | | 2/1996 | Smiedt |
| 5,510,780 A | | 4/1996 | Norris et al. |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

Robert Fogerson, et al. "Qualitative Detection of Opiates in Sweat by EIA and GC-MS"Journal of Analytical Toxicology, Oct. 6, 1997, vol. 21, No. 6, pp. 451-458(8) (Abstract).

(Continued)

*Primary Examiner* — Phung Nguyen
(74) *Attorney, Agent, or Firm* — Mark E. Scott; Conley Rose, P.C.

(57) ABSTRACT

Rule-based intoxicating substance testing associated with vehicles. At least some of the various embodiments are methods including: receiving a signal that a prospective driver intends to drive a vehicle; retrieving at least one previously stored rule regarding intoxicating substance testing associated the vehicle; retrieving data relevant to the rule; determining whether intoxicating substance testing is indicated by the rule; enabling the vehicle responsive to an indication that intoxicating substance testing is not indicated; and administering an intoxicating substance test to the prospective driver responsive to an indication that an intoxicating substance test is indicated. And if the intoxicating substance test is administered: enabling the vehicle responsive to the prospective driver passing the intoxicating substance test, the enabling by the onboard device; and disabling the vehicle responsive to the prospective driver failing the intoxicating substance test, the disabling by the onboard device.

36 Claims, 7 Drawing Sheets

(56) References Cited

U.S. PATENT DOCUMENTS

| | | |
|---|---|---|
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,249,217 B1 | 6/2001 | Forbes |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,299,890 B2 * | 11/2007 | Mobley et al. ................ 180/272 |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,561,102 B2 | 7/2009 | Duvall |
| 7,823,681 B2 * | 11/2010 | Crespo et al. ................ 180/272 |
| 7,873,455 B2 | 1/2011 | Arshad et al. |
| 7,877,269 B2 | 1/2011 | Bauer et al. |
| 7,930,211 B2 | 4/2011 | Crolley |
| 8,018,329 B2 | 9/2011 | Morgan et al. |
| 8,095,394 B2 | 1/2012 | Nowak et al. |
| 8,140,358 B1 | 3/2012 | Ling et al. |
| 8,217,772 B2 | 7/2012 | Morgan et al. |
| 8,370,027 B2 * | 2/2013 | Pettersson et al. .............. 701/45 |
| 2001/0040503 A1 | 11/2001 | Bishop |
| 2002/0019055 A1 | 2/2002 | Brown |
| 2002/0193926 A1 | 12/2002 | Katagishi et al. |
| 2003/0036823 A1 | 2/2003 | Mahvi |
| 2003/0151501 A1 | 8/2003 | Teckchandani et al. |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 * | 12/2004 | Karsten ........................ 340/576 |
| 2005/0017855 A1 | 1/2005 | Harvey |
| 2005/0033483 A1 | 2/2005 | Simon et al. |
| 2005/0134438 A1 | 6/2005 | Simon |
| 2005/0162016 A1 | 7/2005 | Simon |
| 2005/0270178 A1 | 12/2005 | Ioli |
| 2006/0059109 A1 | 3/2006 | Grimes |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0176771 A1 | 8/2007 | Doyle |
| 2007/0185728 A1 | 8/2007 | Schwarz |
| 2007/0194881 A1 | 8/2007 | Schwarz |
| 2008/0114541 A1 | 5/2008 | Shintani et al. |
| 2008/0162034 A1 | 7/2008 | Breen |
| 2008/0221743 A1 | 9/2008 | Schwarz et al. |
| 2009/0043409 A1 * | 2/2009 | Ota ................................ 700/90 |
| 2009/0182216 A1 | 7/2009 | Roushey, III |
| 2010/0148947 A1 | 6/2010 | Morgan |
| 2010/0268402 A1 | 10/2010 | Schwarz et al. |
| 2011/0050407 A1 * | 3/2011 | Schoenfeld et al. ...... 340/426.11 |
| 2011/0057800 A1 * | 3/2011 | Sofer ........................... 340/576 |
| 2011/0084820 A1 * | 4/2011 | Walter et al. ............. 340/426.24 |

FOREIGN PATENT DOCUMENTS

| | | |
|---|---|---|
| WO | 2007/092272 | 8/2007 |
| WO | 2007/092287 | 8/2007 |
| WO | 2010/068438 A2 | 6/2010 |

OTHER PUBLICATIONS

Rafael De La Torre, et al. "Usefulness of Sweat Testing for the Detection of Cannabis Smoke", 2004 American Association for Clinical Chemistry, Inc., 29th Arnold O. Beckman Conference Apr. 12-13, 2011—San Diego, CA.

US 5,699,633, Oct. 1999, Roser (withdrawn).

On Time Payment Protection Systems, printed Jan. 2, 2004 from www.ontime-pps.com/how.html.

Aircept Products, printed Jan. 2, 2004 from www. aircept. com/products.html.

How PayTeck Works, printed Jan. 2, 2004 from www. payteck.cc/aboutpayteck.html.

Article: "Pager Lets You Locate Your Car, Unlock and Start It", published Dec. 10, 1997 in USA Today.

Article: "Electronic Keys Keep Tabs on Late Payers", published Sep. 22, 1997 in Nonprime Auto News.

Article: "PASSTEC Device Safely Prevents Vehicles from Starting", published Jul. 19, 1999 in Used Car News.

Payment Clock Disabler advertisement, published, May 18, 1998.

Secure Your Credit & Secure Your Investment (Pay Teck advertisement), printed Jan. 2, 2004 from www. payteck.cc.

(56) References Cited

OTHER PUBLICATIONS iMetrik Company Information, printed Dec. 21, 2006 from imetrik.com.
About C-Chip Technologies, printed Dec. 21, 2006 from www.c-chip.com.
Hi-Tech tools to solve traditional problems, printed Dec. 21, 2006 from www.c-chip.com.
C-CHIP Technologies Products: Credit Chip 100, Credit Chip 100C, Credit Chip 200, printed Dec. 21, 2006 from www. c-chip.com.
The Credit Chip 100, printed Dec. 21, 2006 from www.c-chip.com.

* cited by examiner

METHODS AND SYSTEMS OF RULE-BASED INTOXICATING SUBSTANCE TESTING ASSOCIATED WITH VEHICLES

BACKGROUND

Conventional ignition interlock devices disable a vehicle under certain conditions, so that its engine cannot be started. Such a mechanism can be used to reduce drunk driving, by requiring a prospective driver to submit to a blood alcohol level test prior to starting the engine. The prospective driver can be required to exhale into the device; if the detected breath-alcohol concentration indicates a blood alcohol concentration greater than a threshold amount, the vehicle's starter can be disabled, so as to prevent the vehicle from being driven.

Many jurisdictions require ignition interlock devices to be installed in vehicles under certain circumstances; for example, prospective drivers convicted of driving under the influence of alcohol may be required to have such a device installed in their vehicles for some period of time after the conviction. Such requirements vary from jurisdiction to jurisdiction.

Existing ignition interlock devices are relatively inflexible, however, and they fail to adapt to or respond to current situations. Thus, the requirement to submit to the blood alcohol test can be unduly burdensome at certain times or in certain situations when the risk of drunk driving is relatively low and the test is relatively unnecessary. Conversely, the testing requirements may be too lax at other times when the prospective driver is at greater risk of driving under the influence, or when it is easier for a prospective driver to defeat the test.

The relative inflexibility of existing ignition interlock devices, and their relative inability to adapt to current situations and contexts, limits the effectiveness of such devices in reducing driving under the influence.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Identifying" shall mean making a determination as to an identity of a person, but shall not require determining an absolute identity. Determining that the person is not known or not previously identified shall still be consider as identifying.

"Proximate", relative to a vehicle, shall mean within the vehicle, or within five feet of the vehicle.

"Remote" or "remotely", relative to a vehicle, shall mean a distance of greater than one mile.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of blood alcohol testing as a prerequisite to driving a vehicle, and the discussion below is based to some extent on the developmental context; however, the various embodiments are applicable to testing for any intoxicating substance (e.g., opiates, tetrahydrocannabinol), and thus the developmental context shall not be read as a limitation as to the applicability of the various embodiments.

For purposes of the following description, "vehicle owner", "owner", "driver", "prospective driver", and "user" are synonymous and can refer to any individual who is interacting with the components of the various embodiments. The term "prospective driver" is used to indicate that testing can be performed when an individual wishes to drive vehicle 109, and that the system can operate to prevent the individual from actually driving vehicle 109 (by, for example, disabling the starter). However, for ease of nomenclature, such a "prospective driver" may be referred to herein simply as a "driver" even though he or she may have been prevented from actually driving the vehicle.

Figure 1A:
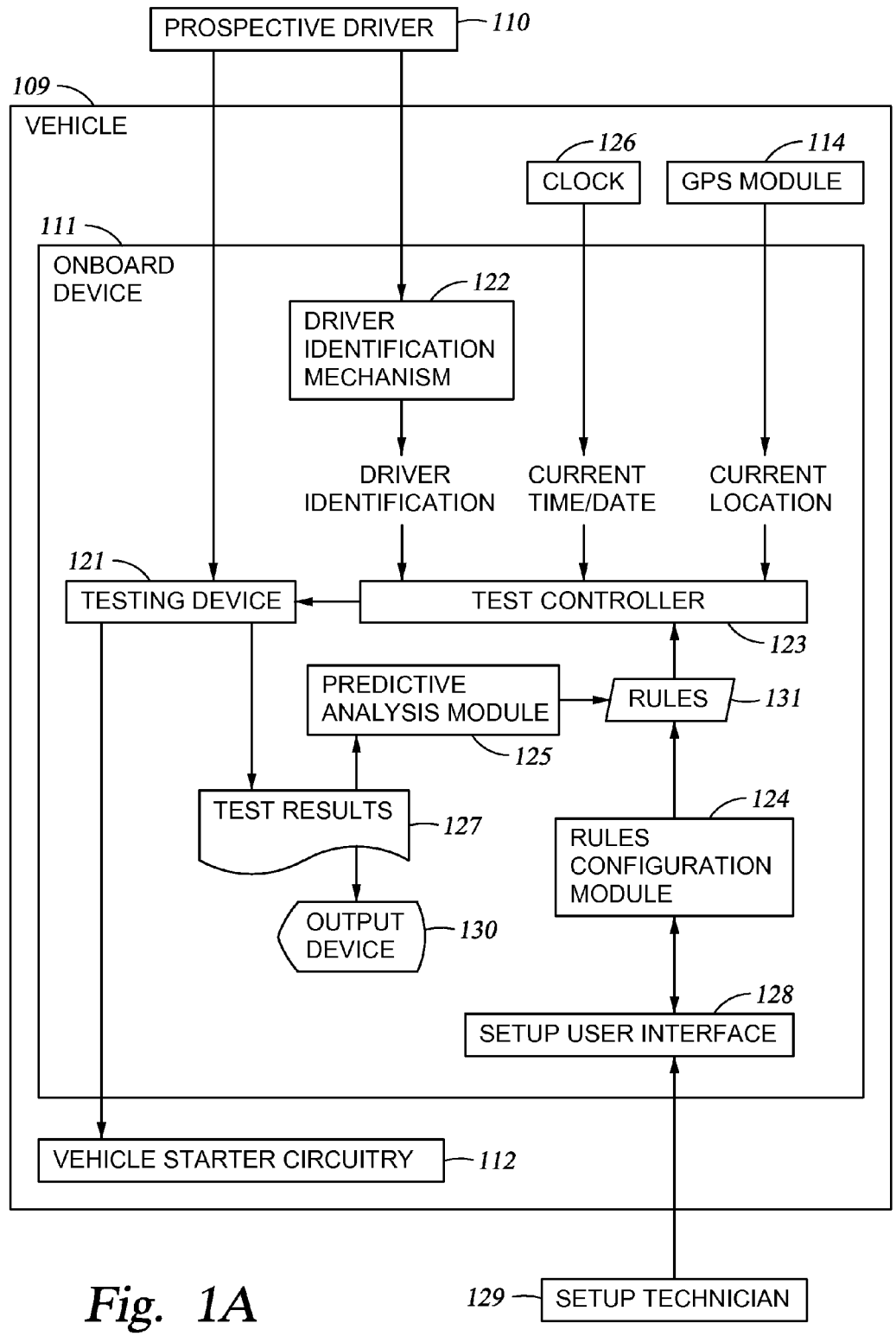
FIG. 1A depicts an architecture for an onboard device according to various embodiments.

Referring now to FIG. 1A, there is shown a block diagram depicting an architecture for an onboard device 111 according to particular embodiments, wherein intoxicating substance testing (e.g., testing indicative of blood alcohol concentration (BAC)) is configured and performed onboard vehicle 109.

The various components shown as part of onboard device 111 are installed on, installed within, and or associated with vehicle 109. The components that are installed on vehicle 109 or associated with vehicle 109 may be referred to herein as "onboard" components. In a particular embodiment, testing and disablement of the vehicle can be implemented solely with onboard components without requiring communication with or control by an operations center or other remote site. FIG. 1A depicts an example of an architecture that can be implemented in such stand-alone fashion, wherein the system is configured and operated as an onboard device 111 that functions without the need for communication with an operations center. In other embodiments described in more detail below, the test system can be implemented in a manner that involves communication with and interaction with an operations center.

Onboard device 111 can be pre-installed in vehicle 109 or can be an add-on component. For example, onboard device 111 can be installed in vehicle 109 as part of a driving under the influence (DUI) enforcement program, wherein a driver convicted of drunk driving can be required to have an ignition interlock system installed in vehicle 109 in order to be permitted to continue driving. In one embodiment, onboard device 111 is connected to vehicle starter circuitry 112 so as to provide the ability to selectively disable vehicle 109 in the event of a violation of an intoxicating substance test.

Onboard device 111 contains several illustrative components, as shown in FIG. 1A, that implement a system for configurable and adaptive in-vehicle intoxicating substance testing. One skilled in the art will recognize that the various components shown in FIG. 1A are merely exemplary, and that the system can be equivalently implemented in various other configurations, some of which may omit some of the components shown in FIG. 1A and/or include other components not depicted in FIG. 1A.

Driver identification mechanism 122 identifies driver 110 using any suitable system. Examples of identification mechanism 122 include: fingerprint analysis (for example, using sensors located on the steering wheel of vehicle 109, touchpad, or the like), retina or iris scanning, and/or voiceprint identification.

In one embodiment, driver identification mechanism 122 identifies driver 110 by comparing driver's 110 detected characteristics (such as fingerprint and/or iris data) against data stored locally at onboard device 111, so that onboard device 111 performs the authentication without having to consult an external entity such as an operations center. In another embodiment, onboard device 111 transmits data to an operations center where it can be compared against stored information and/or a registry of individuals, so as to identify the prospective driver 110.

Identification of driver 110 enables the system to apply rules 131 that are specific to individuals (e.g., enforcing more stringent testing requirements for some drivers than for others). Such requirements can be based on any known factor(s), including for example driving history, age, demographics, DUI conviction history, or the like. Thus, for example, some individuals within a particular household may be required to submit to an intoxicating substance test every time they wish to drive vehicle 109, while others may be allowed to drive without submitting to such a test. As will be described below, further specification of testing requirements may be based upon various factors such as current location, day of week, time of day, and the like. In addition, in determining whether to administer an intoxicating substance test, the system can also take into account additional external data, for example entered by an administrator (e.g., the administrator can indicate that certain individuals are higher-risk, or have previous DUI convictions, or the like). Alternatively, such information can be obtained from any available source.

In one embodiment, the illustrative system can also be used to limit or restrict a driver's driving time. For example, some court-imposed driving limits for those convicted of driving under the influence may comprise time limits, such as driving only to and from work during particular times of the day. Thus, the illustrative system can be used to limit the times of day a particular driver may drive. As yet another example outside the context of intoxicating substances, for a commercial truck driver the system can track how many hours the driver has driven on a particular day, and not allow the driver to start the vehicle if the particular driver is over a time limit. Thus, the illustrative techniques can be used in connection with intoxicating substance testing or as a separate component to reduce unsafe driving by drowsy drivers. A similar mechanism can be used, for example, to limit a teenager's drive time in accordance with the parents' wishes. Driver identification can be used to enforce such limits with respect to individual drivers. In some case, an internal clock can be used to track the amount of time a particular driver 110 has driven within some period such as a day or week. In yet still other cases, time can be derived from any available source, such as the vehicle itself, GPS signals, cellular network signals, or radio broadcasts of the official time from the National Institute of Science and Technology in Boulder Colo.

In a particular embodiment, testing device 121 is a device for testing or estimating the blood alcohol concentration of driver 110. Testing device 121 in the case of BAC testing can be implemented using any suitable mechanism or system. Examples of BAC testing device include a breath testing device ("breathalyzer"), a transdermal alcohol monitor that measures BAC based on ethanol content in perspiration, and the like. Likewise, testing for indications of opiate consumption, or tetrahydrocannabinol consumption (I.e., the active ingredient in marijuana) may be administered by way of a breath-based or transdermal-based measurement. Further still, intoxicating substance testing may further comprises testing for metabolites of intoxicating substances (i.e., the products of the body breaking or metabolizing the intoxicating substance) as indicative of consumption.

In one embodiment, a combination of two or more testing methodologies can be used, for improved accuracy. In one embodiment, testing device 121 can be built into or combined with other components of the overall system, and/or with other components of vehicle 109; for example, a steering wheel of vehicle 109 can include a transdermal alcohol monitor so that BAC can be estimated for an individual when he or she grips the steering wheel. Fingerprint detection can also be performed using a steering-wheel based device. Thus, a single hardware component can serve multiple functions.

In one embodiment, testing device 121 generates test results 127. In various embodiments, test results 127 may be displayed on output device 130 (such as a display screen).

In one embodiment, testing device 121 is coupled to vehicle starter circuitry 112 in a manner that enables device 121 to disable vehicle starter circuitry 112. In another embodiment, the testing device 121 may couple to any system capable of disabling the car, such as the fuel system, electronic ignition system, or the vehicle's main computer (i.e., the body computer). Thus, if driver 110 fails the one or more tests administered by the test device 121, he or she can be prevented from driving vehicle 109.

In a particular embodiment, test controller 123 is an electronic device that controls the operation of testing device 121, for example by specifying when a test should be administered, and further specifying the nature of the test. In one embodiment, test controller 123 is an electronic computing device that includes a processor and software for controlling the operation of the processor. According to illustrative techniques, test controller 123 determines when and how to test the driver 110 based on any of a number of different factors, including for example: identification of the driver (obtained from driver identification mechanism 122); current time and/or date (obtained from clock 126); current location (obtained from GPS module 114); and rules 131 specifying conditions under which intoxicating substance testing should be imposed.

In one embodiment, rules 131 are generated by rules configuration module 124, which may be a software-based component, such as an electronic computing device, that enables a setup technician 129 to specify rules 131 using a setup user interface 128. Thus, for example, setup technician 129 may specify conditions under which intoxicating substance testing should be imposed for particular drivers 110 of vehicle 109. As yet another example, the conditions under which intoxicating substance testing should be applied may be initially programmed or changed later, by way of wireless communication. Rules 131 can be stored in a storage device, using any desired data format. Rules 131 can specify testing requirements in relation to any known environmental factors, including but not limited to time of day, location, day of week, driver 110 identification, proximity to certain types of business establishments such as bars, and the like, including any combination thereof. Any suitable data format can be used for storing rules 131, such as a database record in an electronic storage device.

Rules 131 may specify testing requirements in terms of geo-fences, which are defined perimeters in geographical space, where certain testing rules should apply. For example, rules 131 may be established which allow driving without BAC testing when vehicle 109 is on a farm or in a rural area, while requiring BAC testing when in an urban area. A geo-fence can be established, for example by system administrator in connection with administrative user interface (Admin UI) 128 and mapping module 116, to demarcate those areas where testing is required from those where testing is not required. A geo-fence likewise may be initially established, or later changed, by wireless communication as well. Once such a geo-fence is established, rules 131 can enforce testing requirements based on vehicle's 109 position with respect to the geo-fence.

In one embodiment, geo-fence parameters can be loaded onto onboard device 111. Device 111 can detect whether the device is within a geo-fence requiring testing, and can impose appropriate testing according to current location and the defined geo-fence. In another embodiment, geo-fence definitions can be maintained at an operations center 101 (as described below in connection with FIG. 1C), and vehicle 109 location can be transmitted to operations center. Operations center 101 can specify which rules to apply based on the determined vehicle 109 location with respect to the defined geo-fence. Operations center 101 can transmit indications to onboard device 111, specifying which rule to use.

Figure 1B:
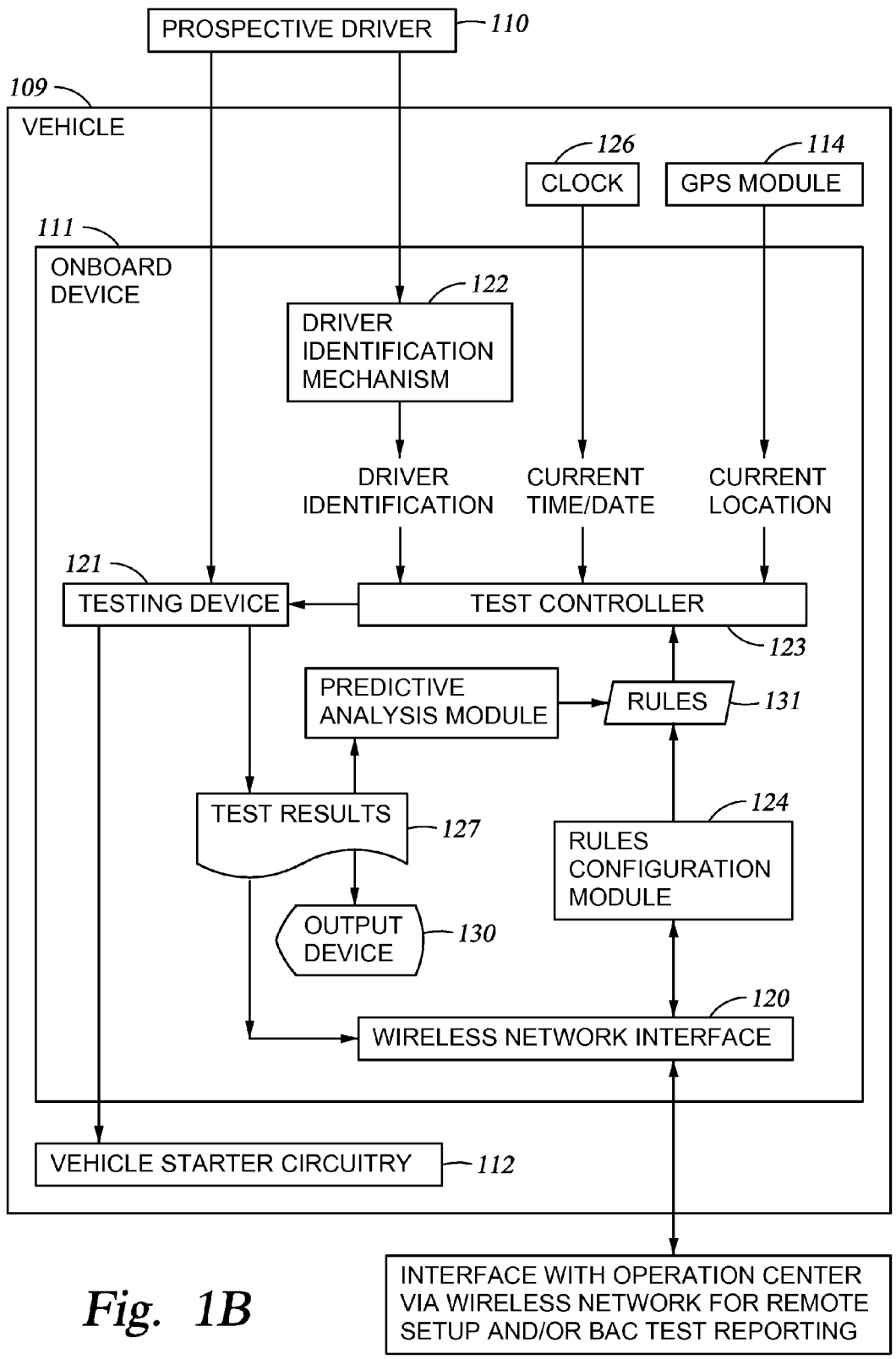
FIG. 1B depicts an architecture for an onboard device according to various embodiments, including a wireless network interface for communication with an operations center.
Figure 1C:
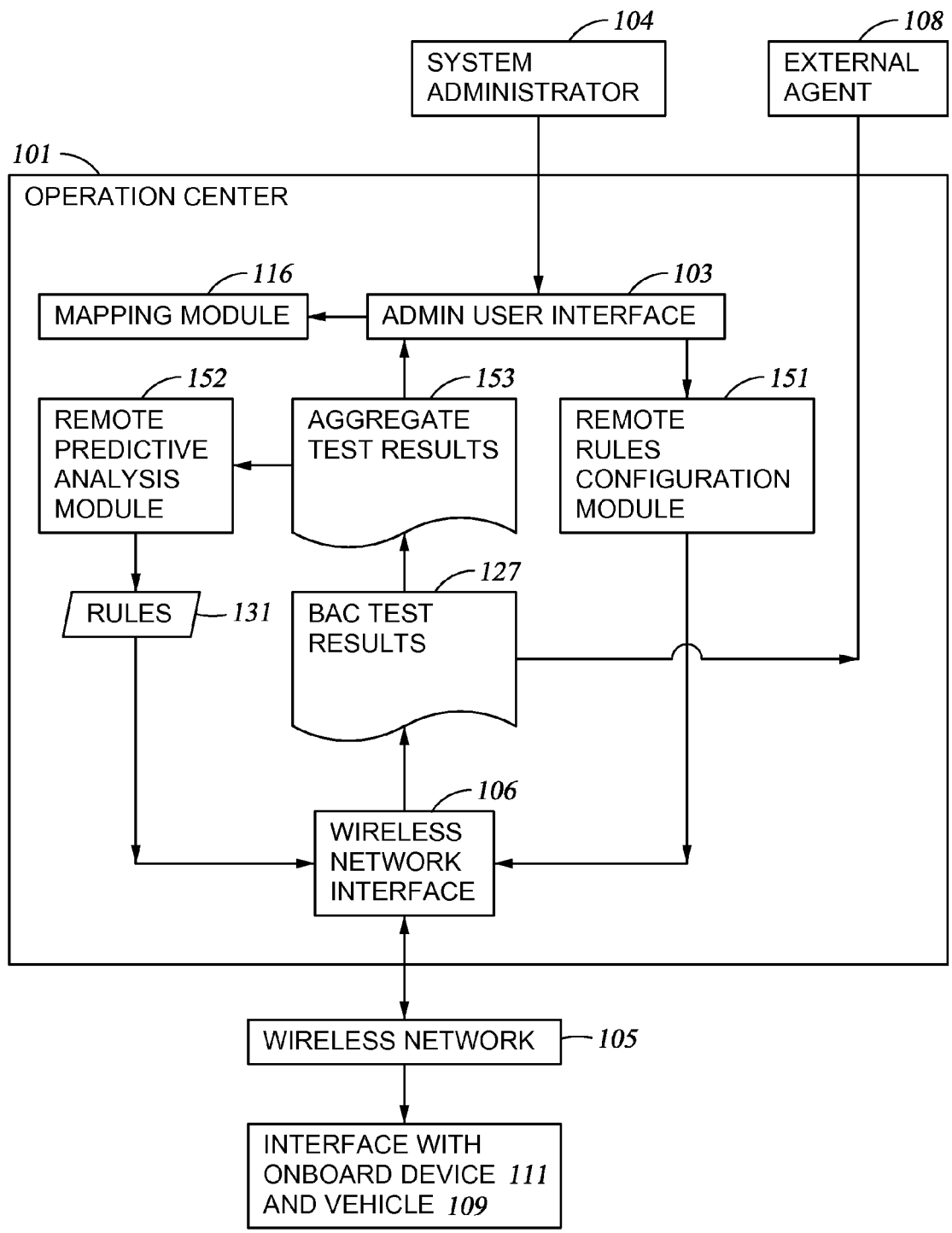
FIG. 1C depicts an architecture for an operations center for performing remote rules configuration and predictive analysis, according to various embodiments.

Thus, the determination as to which rules to apply based on vehicle location can be made at vehicle 109 or at another location such as the operations center 101 of FIG. 1C.

Rules 131 can also specify the type and/or degree of testing for in a given situation. For example, in particular situations, stricter testing, such as a rolling test, may be required. A rolling test is a test that occurs at random or preset intervals once driving has commenced. The rolling test is designed to thwart drivers 110 attempts to defeat system, such as by having a friend blow into the testing device 121 performing BAC testing. The rolling test may also deter drivers 110 from taking intoxicating substances once vehicle 109 has been started.

In one embodiment, onboard device 111 is adaptive, so that the onboard device 111 can learn from detected patterns of violations, near-violations, and/or non-violations. Predictive analysis module 125, which in one embodiment is a software-based component, receives test results 127 and performs a predictive analysis in order to detect patterns from results 127. In one embodiment, module 125 takes into account other factors, such as time of day, day of week, and/or geographic location at the time of violations, near-violations, and/or non-violations, so that existing rules 131 can be adapted and/or modified, and new rules 131 can be generated. For example, if BAC test results 127 tend to indicate higher BAC at certain times of day, the information can be used to determine what type of testing should be performed at those times of day, as well as what type of enforcement should be performed (such as by disabling vehicle starter circuitry 112). As another example, a driver has one or more near-violations at certain times or locations (e.g., has an indication of elevated BAC, but still below a violation threshold), such information can be used by the predictive analysis module 125. If driver 110 is determined to be at risk of attempting to drive drunk, based on current time, day of week, and or location, he or she may be subjected to additional testing, or testing with changed (e.g. lowered) thresholds, before being allowed to drive vehicle 109. As another example, if several consecutive BAC tests indicate that a particular driver 110 consistently passes the BAC test when it is imposed at certain times of day (such as before noon), predictive analysis module 125 may modify rules 131 to indicate that BAC testing is no longer required for that driver 110 at those times of day.

In one embodiment, the system informs driver 110 of the testing requirement, for example via a screen, display, or any other suitable output device 130. In one embodiment, driver 110 can be informed of the requirement via a more discreet method, such as a short message service (SMS), email message sent to driver's 110 mobile phone or other device, message sent by way of Bluetooth network directly to the driver's phone, CDMA communications, GSM communications, or by some other method. Onboard device 111 can include any suitable output device or transmission component to provide such notification to driver 110, for example as part of testing device 121 or as a separate component.

In one embodiment, predictive analysis module 125 and/or rules configuration module 124 can be implemented as software that instructs a processor to perform certain steps in a defined order.

Additional functionality can also be provided. For example, in one embodiment, driver identification mechanism 122 can identify drivers who should not be permitted to drive at all (e.g., if a driver is not registered as the owner or authorized driver of vehicle 109, the driver's license has been revoked, insurance has lapsed, or for any other reason). Some drivers 110 may be permitted to drive at certain times of day (such as to and from work), but can be prohibited from driving at other times. If appropriate, onboard device 111 can communicate with an operations center or other source of such information to determine if a driver's license has been revoked. In a situation where a driver 110 is not authorized to drive vehicle 109, onboard device 111 can cause vehicle starter circuitry 112 to be disabled. An emergency override may be provided, if appropriate, to allow driver 110 to drive a limited distance in case of emergency even if he or she would otherwise be prohibited from driving. Availability of such override can depend on current detected location of vehicle 109 as well as on other factors (for example, no override may be permitted if the driver 110 fails a BAC test).

Referring now to FIG. 1B, there is shown an architecture for onboard device 111 according to another embodiment, wherein onboard device 111 includes wireless network interface 120 for communication with an operations center. Referring now to FIG. 1C, there is shown an architecture for an operations center 101 for performing remote rules configuration and predictive analysis in connection with onboard device 111 as shown in FIG. 1B. Operations center 101 may be located remotely with respect to vehicle 109. Wireless network interface 120 of onboard device 111 communicates via wireless network 105 or by some other means with operations center 101. Wireless network 105 may be any conventional cellular network, 3G network, 4G network, pager network, WI-FI® brand network, Worldwide Interoperability for Microwave Access (WiMAX) network, or other mechanism for transmitting information between vehicle 109 and operations center 101. In one embodiment, operations center 101 includes wireless network interface 106 facilitating communication via network 105.

Communication between operations center 101 and onboard device 111 enables operations such as setup of rules configuration to be performed by system administrator 104 at the operations center (or at any other location). For example, system administrator 104 can interact with administrator user interface 103 to perform setup and to specify rules for intoxicating substance testing. Remote rules configuration module 151, located at operations center 101, transmits rules to onboard vehicle 111 via wireless network interface 106 and wireless network 105. In this manner, rules can be specified and/or modified at a central location, without the need for direct entry at onboard device 111. In one embodiment, administrative user interface 103 is provided via a secure web-based protocol, so that system administrator 104 can log into the system and specify and/or modify rules from any location using a web browser. In a particular embodiment, onboard rules configuration module 124 is omitted, so that rules configuration is performed by module 151 at operations center 101, and rules 131 are transmitted to onboard device 111 using wireless network interfaces 106 and 120.

Communication between onboard device 111 and operations center 101 also enables test results 127 to be transmitted from vehicle 109 to operations center 101 for further analysis. Test results 127 from different vehicles 109 can be aggregated with one another and stored as aggregated test results 153 at operations center 101, for example in a database. In one embodiment, additional data such as time of day, location, day of week, and the like can be stored for test results 153. In one embodiment, system administrator 104 can view aggregated test results 153 via administrative user interface 103.

In one embodiment, mapping module 116 may also be provided at operations center 101. System administrator 104 can interact with mapping module 116 via administrative user interface 103. Mapping module 116 can provide useful information regarding locations of bars and other establishments that tend to correlate with violations, such as BAC violations. In one embodiment, system administrator 104 can use mapping module 116 to specify geo-fences.

In one embodiment, operations center 101 can be configured to notify one or more external agents 108, such as a local police department, of a violation under certain circumstances. Alternatively, external agent 108 may be a taxicab company, so that a taxi can be automatically summoned for driver 110, thus reducing the likelihood that driver 110 will attempt to circumvent the ignition interlock system. Transmission of such notification can take place across any suitable communication channel or channels, including for example: a telephone call, an email message, an SMS message, an instant message, or the like. The notification can be sent over police radio or other mechanisms, if desired. Additional information, such as current vehicle location, driver identification, or the like, can also be transmitted as part of the notification so as to assist in responding to the situation.

In another embodiment, rules configuration and predictive analysis can be performed at operations center 101. Operations center 101 includes remote predictive analysis module 152, which uses aggregated test results 153 from a plurality of vehicles 109 to generate rules. In this manner, the rules can take into account observed patterns among a plurality of drivers and vehicles. Such rules can therefore be more accurate and effective than rules generated based solely on test results 127 generated at a single vehicle 109. Observed patterns of intoxicating substances violations may be more robust when multiple test results from different vehicles 109 are available; for example, correlations between a particular location and BAC violations among many vehicles 109 can indicate that a rule should be generated requiring BAC testing when a vehicle 109 is at that location, even if that particular vehicle 109 has never been to that location before.

In one embodiment, module 152 transmits generated rules to onboard device 111 for storage and application thereon.

In one embodiment, rules configuration and generation can take place at both onboard device 111 and operations center 101. In another embodiment, configuration and generation can take place solely at operations center 101, and rules configuration module 124 can be omitted from onboard device 111.

Figure 2A:
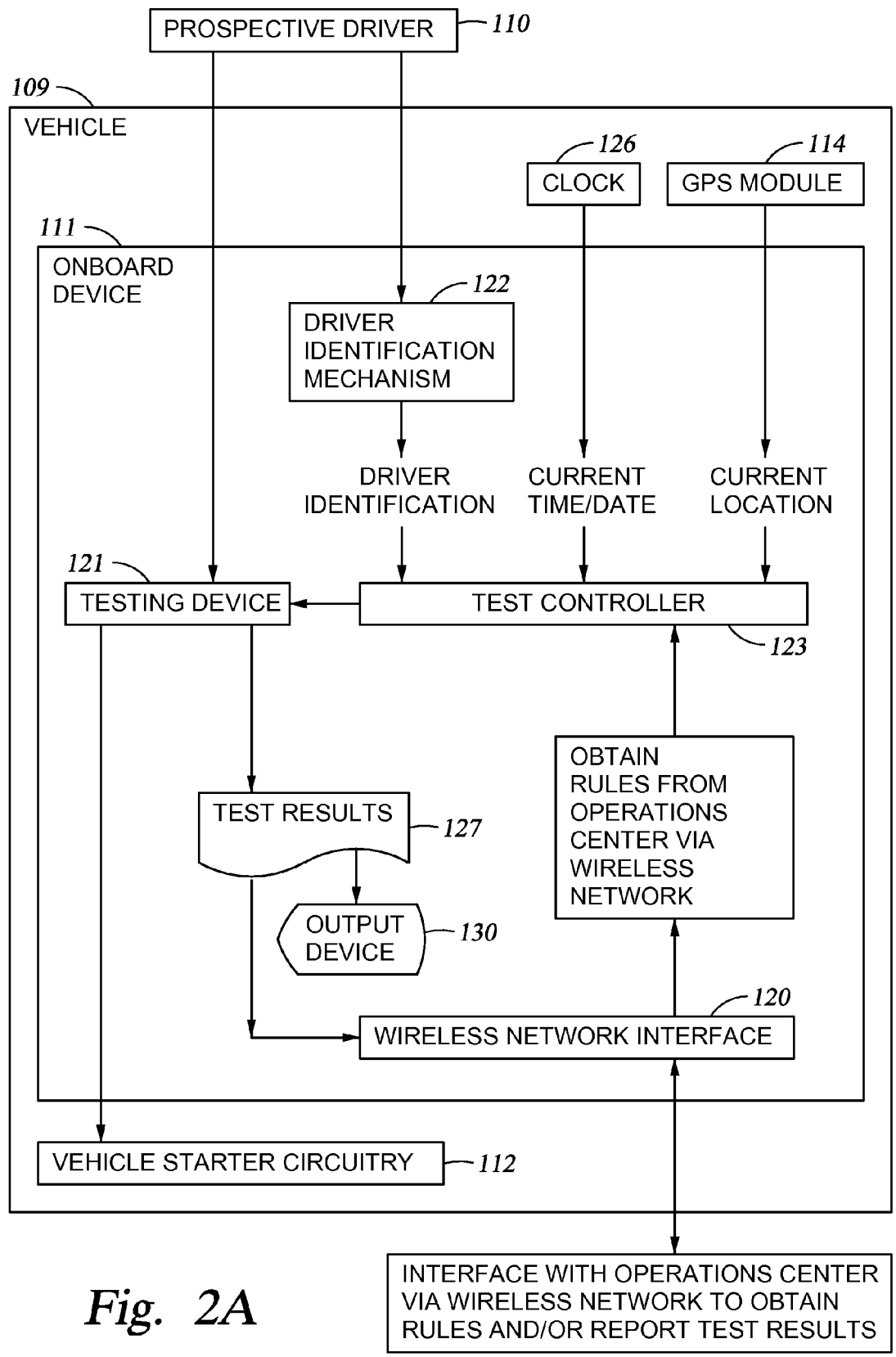
FIG. 2A depicts an architecture for an onboard device according to various embodiments, wherein testing is configured at an operations center and performed onboard a vehicle.
Figure 2B:
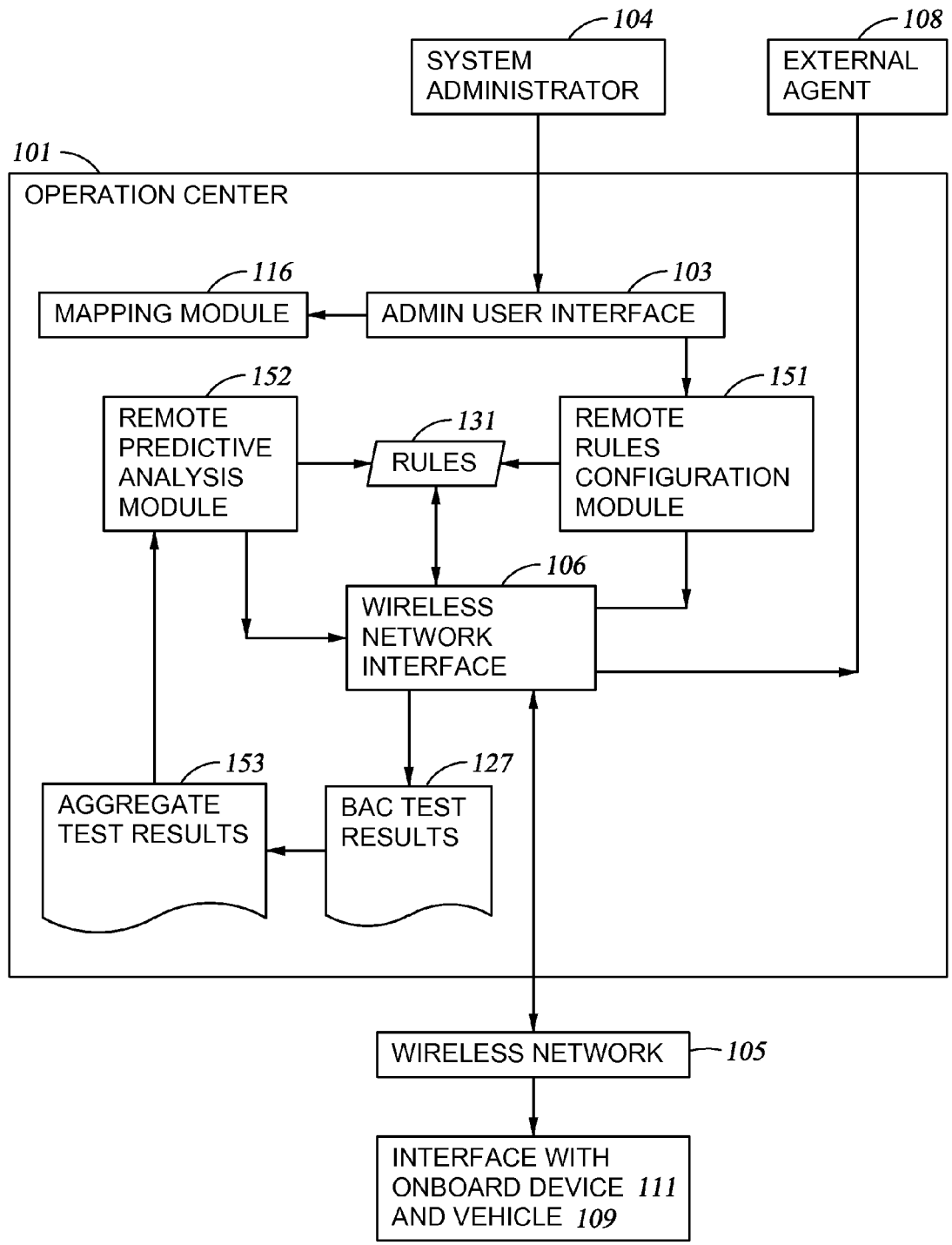
FIG. 2B depicts an architecture for an operations center for performing remote rules configuration and predictive analysis, according to various embodiments.

Referring now to FIGS. 2A and 2B, there is shown other embodiments for onboard device 111 and operations center 101, wherein rules 131 are generated and stored at operations center 101. When a prospective driver 110 attempts to start vehicle 109, onboard device 111 queries operations center 101 via wireless network interfaces 105, 120 to determine whether testing is warranted. Operations center 101 checks rules 131 and provides appropriate instruction to onboard device 111. In this manner, rules application is centralized at operations center 101. Default instructions can be provided at onboard device 111 in case transmission with operations center 101 cannot be established or is interrupted; for example, onboard device 111 can be configured to always require BAC testing if contact with operations center 101 cannot be established. In other cases, the operations center 101 need not be queried each time a driver attempts to start the vehicle, but may rely on previous queries (e.g., onboard device 111 may query for a particular driver at some predetermined interval (such as every other or every third attempt to start the vehicle)).

According to the embodiment of FIGS. 2A and 2B, test results 127 are transmitted to operations center 101 via wireless network interfaces 105, 120. Operations center 101 stores aggregated test results 153 as described above in connection with FIG. 1C. Remote predictive analysis module 152 uses aggregated test results 153 from a plurality of vehicles 109 to generate rules 131. In the illustrative embodiment, rules 131 are stored at operations center 101, for example in a database (not shown). Subsequently, operations center 101 applies such rules when responding to queries from onboard devices 111 to determine whether intoxicating substance testing is required for a particular driver 110 at a particular time and place.

Other components of FIGS. 2A, and 2B operate in a similar manner to that described above in connection with FIGS. 1B and 1C.

Figure 3:
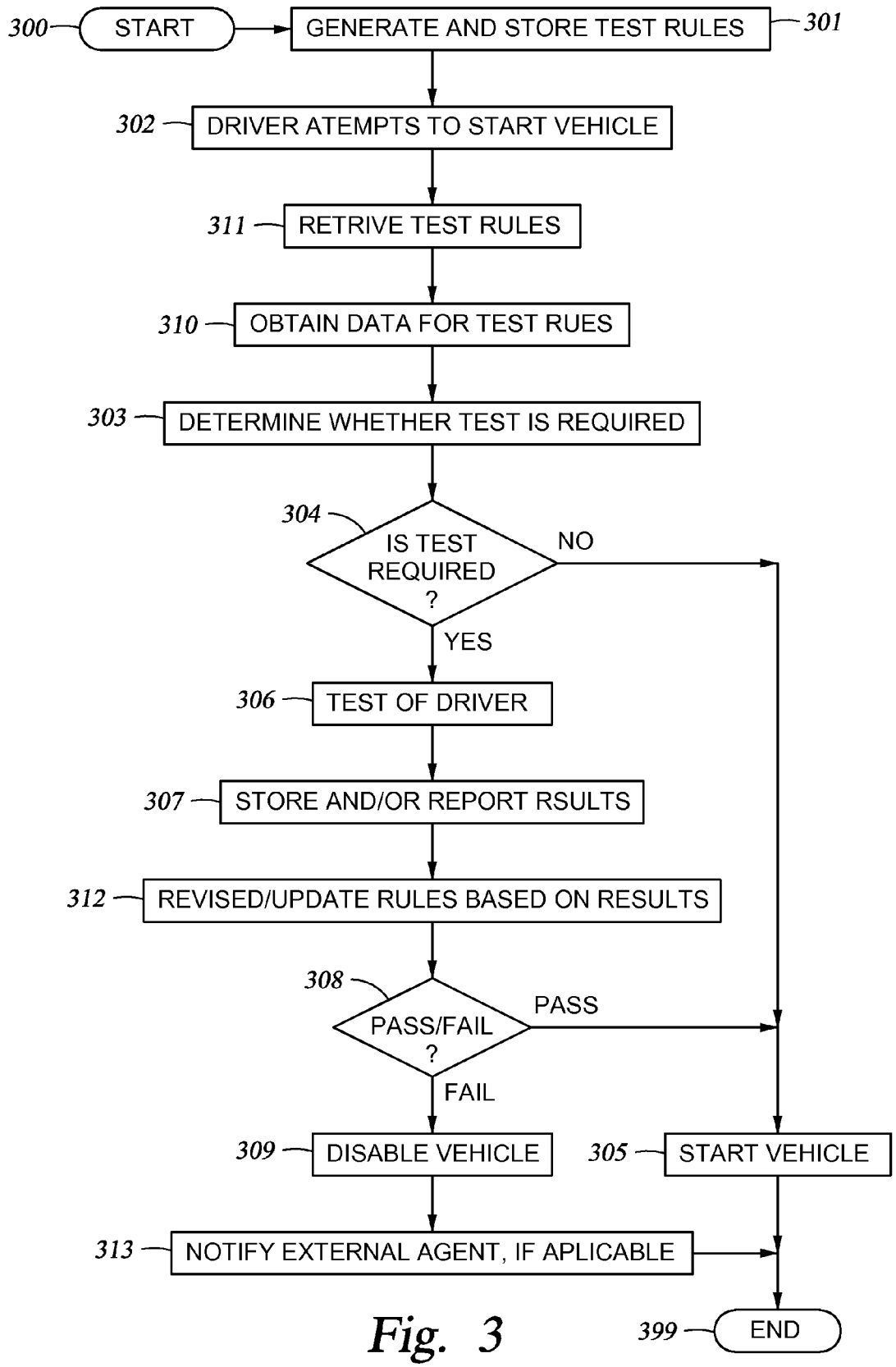
FIG. 3 is a flow diagram depicting an overall method of performing testing according to various embodiments.

Referring now to FIG. 3, there is shown a flow diagram depicting an overall method of performing intoxicating substance testing according to various embodiments. The method of FIG. 3 can be performed using any suitable architecture for onboard device 111 and/or operations center 101, including those described above in connection with FIGS. 1A, 1B, 1C, 2A, and/or 2B.

Test rules 131 are generated and stored 301, either at operations center 101 or at onboard device 111. In one embodiment, rules 131 are generated based on manual specification by system administrator 104 or setup technician 129, or by some other individual. In another embodiment, rules 131 can be automatically generated based on observed behavior of a single driver 110 or any defined group of drivers 110. In yet another embodiment, an initial set of default test rules 131 are established.

Driver 110 attempts 302 to start vehicle 109, or indicates that he or she intends to start vehicle 109. In one embodiment, this step is performed by driver 110 inserting a key into the ignition of vehicle 109, or entering vehicle 109, or pressing a button, or performing some other action indicating an intent to drive.

In response to driver's 110 action, test rules 131 are retrieved 311. In one embodiment, rules 131 are locally stored at onboard device 111, and retrieved 311 by test controller 123. In another embodiment, rules 131 are stored at operations center 101; onboard device 111 queries operations center 101, causing rules 131 to be queried there. Data for the test rules 131 is obtained 310. In one embodiment, the applicable test rules 131 may indicate what data is needed. For example, a time of day may be relevant, or a current location may be relevant. Various components, such as clock 126, GPS module 114, driver identification mechanism 122, and the like may be the source of data needed to apply rules 131. Based on applicable rule(s) 131 and on the data obtained in step 310, a determination 303 is made as to whether an intoxicating substance test is required before driver 110 will be permitted to drive.

Step 304 is a decision box controlling the flow of the method after determination 303 is made. If no intoxicating substance test is required, vehicle 109 is started 305 (or driver 110 is permitted to start vehicle 109) and the method ends 399.

If an intoxicating substance test is required, the test is administered 306. As discussed above, in one embodiment, the system of the present invention informs driver 110 of the testing requirement, for example via a screen, display, or any other suitable output device 130. In one embodiment, driver 110 can be informed of the requirement via a more discreet method, such as a SMS or email message, or other method. Onboard device 111 can include any suitable output device or transmission component to provide such notification to driver 110.

Results are stored and/or reported 307. If appropriate, rules 131 are updated based on the results, for example to recognize patterns that indicate that a change in rules 131 may be warranted. Step 308 is a decision box controlling the flow of the method based on the results of the intoxicating substance test. If driver 110 passes the test, vehicle 109 is started 305 (or driver 110 is permitted to start vehicle 109). If driver 110 fails the test, vehicle 110 is disabled 309, for example to disconnecting the starter circuit via an ignition interlock system. Alternatively, driver 110 may be given an opportunity to try again, or other consequences may be imposed. If applicable, an external agent 108 is notified 313; the external agent may be a police department, taxicab, or any other entity. In one embodiment, a taxi can be automatically summoned for driver 110, thus reducing the likelihood that driver 110 will attempt to circumvent the ignition interlock system. In one embodiment, onboard device 111 can send the location of vehicle 109 wirelessly to an operations center, so that vehicle 109 can be removed, impounded, and/or confiscated. The method then ends 399.

Figure 4:
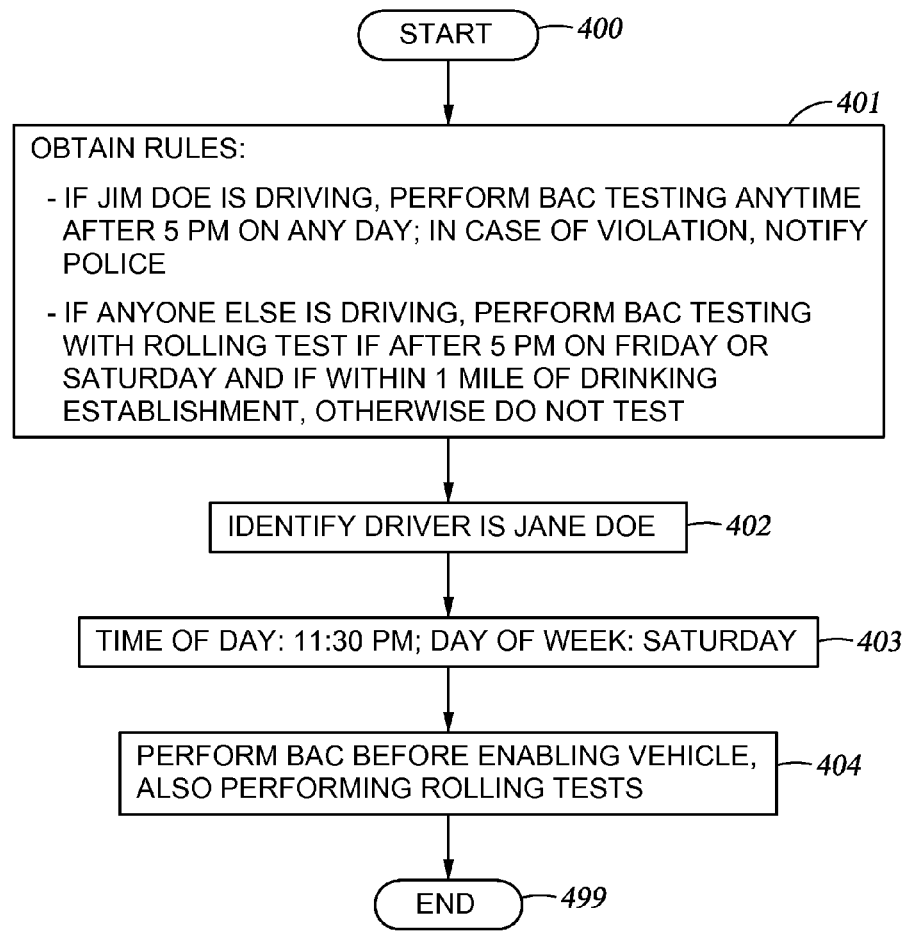
FIG. 4 is a flow diagram depicting an example of a method for determining applicable testing based on a current situation, according to various embodiments.

Referring now to FIG. 4, there is shown a flow diagram depicting an example of a method for determining applicable intoxicating substance testing based on a current situation, according to various embodiments.

In the example step 401, which corresponds to step 311 of FIG. 3, a set of rules 131 is obtained. The illustrative rules 131 specify different testing requirements for Jim Doe than for other drivers, and further specify how time of day and day of week affect illustrative testing requirements. Data is obtained 310 by identifying 402 the driver as Jane Doe, and determining 403 the time of day and day of week. Based on the obtained data, a determination is made in this example that BAC testing with a rolling test requirement should be performed. Therefore, the BAC test is administered 404 with rolling tests at certain intervals.

One skilled in the art will recognize that the steps shown in FIG. 4 are merely exemplary, and are intended to illustrate the operation of a particular embodiment by reference to a particular set of circumstances.

In various embodiments, the techniques discussed herein can be combined with a starter-interrupt device incorporating GPS functionality, and/or with a system for automated geo-fence boundary configuration and activation.

In various embodiments, the systems and methods discussed herein can provide additional functionality. For example, in one embodiment, the system is integrated with the geo-fence functionality described in commonly owned U.S. patent application Ser. No. 12/333,904 for "AUTOMATED GEO-FENCE BOUNDARY CONFIGURATION AND ACTIVATION". Vehicle theft can be detected by movement of vehicle 109 beyond a defined geo-fence. In addition, a geo-fence can be established based on crime rate and other statistics, so that if vehicle 109 enters a high crime rate zones, onboard device 111 can be configured to trigger an alert based on ignition or movement. Detection of attempted ignition prior to deactivating a geo-fence can cause an alert to be sent, thus providing a theft deterrent effect in high-crime areas. In such circumstances, vehicle 109 may also be disabled or immobilized via starter interrupt to prevent theft. Theft by towing can also be detected: if vehicle 109 is moved while the ignition in the off position and prior to deactivating the geo-fence, an alert can be sent to driver 110 or to an external agent 108 so that appropriate action can be taken.

A driver detection system, such as the fingerprint detection system described above, can be used to identify the person trying to start vehicle 109. If an unauthorized driver attempts to drive vehicle 109, vehicle 109 can be disabled. Various other mechanisms can be used for identifying the driver, including for example the use of a portable device (such as a key fob), sending a security code via telephone call, email, SMS, instant message (IM), recognizing the driver based on Bluetooth communication with a cell phone known to belong to the driver, or the like, or any combination thereof. Such precautions can be taken universally, or with respect to certain high-crime regions as defined by a geo-fence.

Figure 5:
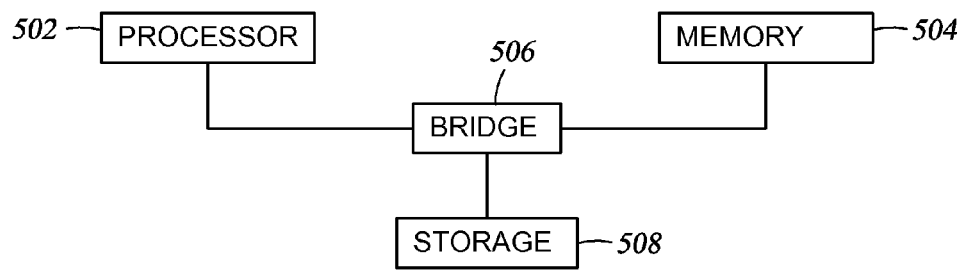
FIG. 5 shows a computer system in accordance with at least some embodiments.

FIG. 5 illustrates a computer system 500 in accordance with at least some embodiments, and upon which at least some of the various embodiments may be implemented. That is, some or all of the various embodiments may execute on a computer system such as shown in FIG. 5, multiple computers systems such as shown in FIG. 5, and/or one or more computer systems equivalent to the FIG. 5 (such as scaled down computer systems for implementation in or within the onboard device 111), including after-developed computer systems.

In particular, the computer system 500 comprises a processor 502, and the processor couples to a main memory 504 by way of a bridge device 506. In some embodiments, the bridge device may be integrated with the processor 502. Moreover, the processor 502 may couple to a long term storage device 508 (e.g., a hard drive) by way of the bridge device 506. Programs executable by the processor 502 may be stored on the storage device 508, and accessed when needed by the processor 502. The programs stored on the storage device 508 may comprise programs to implement the various embodiments of the present specification, including programs to calculate retrieve rules, retrieve data, and implement and command intoxicating substance testing. In some cases, the programs are copied from the storage device 508 to the main memory 504, and the programs are executed from the main memory 504. Thus, both the main memory 504 and storage device 508 are considered computer-readable storage mediums.

In the specification, certain components may be described in terms of algorithms and/or steps performed by a software application that may be provided on a non-transitory storage medium (i.e., other than a carrier wave or a signal propagating along a conductor). In many cases, such descriptions are intended to set forth the embodiments using representations that are used among those of skill in the arts. Accordingly, any descriptions that refer to algorithms, method steps, functional components, and the like, shall be considered to encompass electrical, magnetic, optical, and/or mechanical signals representing such algorithms, method steps, functional components, such signals being capable of being stored, input, output, and/or otherwise manipulated. Reference to these signals as variables, bits, symbols, values, and the like may appear herein and is not intended to limit the scope of the claimed invention in any way.

All such terms, and any similar terms, are to be considered labels only, and are intended to encompass any appropriate physical quantities or other physical manifestations. Any particular naming or labeling of the various modules, protocols, features, and the like is intended to be illustrative; other names and labels can be equivalently used.

In addition, various terms such as "processing", "calculating", "determining", "transmitting", or the like, may be used herein. Such terms are intended to refer to processes performed by a software and/or hardware device such as a computer system. Such terms refer to various types of manipulation and/or transformation of physical and/or electronic components such as registers and memories within the device. These physical and/or electronic components typically represent data elements to be transformed, transmitted, and/or output.

Furthermore, the various aspects can be implemented as a method, system, computer program product, user interface, or any combination thereof.

The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

The method steps, user interface layouts, displays, and other components described herein can be implemented on any computer, network, or other apparatus capable of performing the functions described. No limitation as to operation on a particular type of system or apparatus is implied. No particular programming language is required; rather, any type of programming language can be used to implement the various embodiments.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
  receiving a signal that a prospective driver intends to drive a vehicle, the receiving by an onboard device coupled to the vehicle;
  retrieving at least one previously stored rule regarding intoxicating substance testing associated the vehicle;
  retrieving data relevant to the rule by obtaining a definition of a geo-fence boundary and a current location;
  determining whether intoxicating substance testing is indicated by the rule by analyzing the current location relative to the geo-fence boundary;
  enabling the vehicle responsive to an indication that intoxicating substance testing is not indicated, the enabling by the onboard device;
  administering an intoxicating substance test to the prospective driver responsive to an indication that an intoxicating substance test is indicated, the administering by the onboard device, and if the intoxicating substance test is administered:
    enabling the vehicle responsive to the prospective driver passing the intoxicating substance test, the enabling by the onboard device; and
    disabling the vehicle responsive to the prospective driver failing the intoxicating substance test, the disabling by the onboard device.

2. The method of claim 1 wherein enabling the vehicle further comprises enabling a motor of the vehicle to start.

3. The method of claim 1, wherein administering the intoxicating substance test to the prospective driver further comprises administering a test indicative of blood alcohol content.

4. The method of claim 1, wherein administering the intoxicating substance test to the prospective driver further comprises administering a test indicative of opiate consumption of the prospective driver.

5. The method of claim 1, wherein administering the intoxicating substance test to the prospective driver further comprises administering a test indicative of tetrahydrocannabinol consumption of the prospective driver.

6. The method of claim 1 wherein administering the intoxicating substance test further comprises:
  selecting at least one intoxicating substance test from a plurality of test configurations, the selecting based on the rule and the data; and
  administering at least one intoxicating substance test according to the test configurations.

7. The method of claim 1, wherein the steps of retrieving the at least one previously stored rule, retrieving data relevant to the rule, and determining whether intoxicating substance testing is indicated are performed by the onboard device.

8. The method of claim 1, further comprising modifying at least one previously stored rule based on at least one intoxicating substance test result.

9. The method of claim 1, further comprising:
wherein retrieving data relevant to the retrieved rule further comprises identifying the prospective driver;
wherein determining whether intoxicating substance testing is indicated further comprises applying the rule using an identity of the prospective driver.

10. The method of claim 9, further comprising:
wherein identifying the prospective driver further comprises identifying the prospective driver via fingerprint detection based on physical contact with a component of the vehicle; and
wherein administering the intoxicating substance test further comprises performing transdermal monitoring based on physical contact with the component of the vehicle.

11. The method of claim 10, wherein the component of the vehicle comprises a steering wheel.

12. A method comprising:
receiving a signal that a prospective driver intends to drive a vehicle, the receiving by an onboard device coupled to the vehicle;
retrieving at least one previously stored rule regarding intoxicating substance testing associated the vehicle, the retrieving the at least one previously stored rule at an operations center, the operations center remotely located from the vehicle;
retrieving data relevant to the rule;
determining whether intoxicating substance testing is indicated by the rule based on the data;
enabling the vehicle responsive to an indication that intoxicating substance testing is not indicated, the enabling by the onboard device;
administering an intoxicating substance test to the prospective driver responsive to an indication that an intoxicating substance test is indicated, the administering by the onboard device, and if the intoxicating substance test is administered:
enabling the vehicle responsive to the prospective driver passing the intoxicating substance test, the enabling by the onboard device; and
disabling the vehicle responsive to the prospective driver failing the intoxicating substance test, the disabling by the onboard device.

13. The method of claim 12, wherein retrieving data further comprises retrieving at least one selected from the group consisting of: current time; current date; current day of the week;
identification of prospective driver; and current location of vehicle.

14. The method of claim 12, further comprising:
wherein retrieving data relevant to the retrieved rule further comprises determining a current location of the vehicle; and
wherein determining whether intoxicating substance testing is indicated further comprises using the rule and the current location of the vehicle.

15. A method comprising:
receiving a signal that a prospective driver intends to drive a vehicle, the receiving by an onboard device coupled to the vehicle;
retrieving at least one previously stored rule regarding intoxicating substance testing associated the vehicle;
retrieving data relevant to the rule, the retrieving data at an operations center, the operations center remotely located from the vehicle;
determining whether intoxicating substance testing is indicated by the rule based on the data;
enabling the vehicle responsive to an indication that intoxicating substance testing is not indicated, the enabling by the onboard device;
administering an intoxicating substance test to the prospective driver responsive to an indication that an intoxicating substance test is indicated, the administering by the onboard device, and if the intoxicating substance test is administered:
enabling the vehicle responsive to the prospective driver passing the intoxicating substance test, the enabling by the onboard device; and
disabling the vehicle responsive to the prospective driver failing the intoxicating substance test, the disabling by the onboard device.

16. The method of claim 15, further comprising, if the intoxicating substance test is administered, notifying at least one external agent responsive to the prospective driver failing the intoxicating substance test.

17. A method comprising:
receiving a signal that a prospective driver intends to drive a vehicle, the receiving by an onboard device coupled to the vehicle;
retrieving at least one previously stored rule regarding intoxicating substance testing associated the vehicle;
retrieving data relevant to the rule;
determining whether intoxicating substance testing is indicated by the rule based on the data, the determining at an operations center, remotely located from the vehicle;
enabling the vehicle responsive to an indication that intoxicating substance testing is not indicated, the enabling by the onboard device;
administering an intoxicating substance test to the prospective driver responsive to an indication that an intoxicating substance test is indicated, the administering by the onboard device, and if the intoxicating substance test is administered:
enabling the vehicle responsive to the prospective driver passing the intoxicating substance test, the enabling by the onboard device; and
disabling the vehicle responsive to the prospective driver failing the intoxicating substance test, the disabling by the onboard device.

18. The method of claim 17 further comprising transmitting a signal from the operations center to the onboard device, the signal instructing the onboard device to disable the vehicle.

19. A method comprising:
receiving a signal that a prospective driver intends to drive a vehicle, the receiving by an onboard device coupled to the vehicle;
retrieving at least one previously stored rule regarding intoxicating substance testing associated the vehicle, the retrieving by receiving a signal from an operations center specifying the rule;
retrieving data relevant to the rule;
determining whether intoxicating substance testing is indicated by the rule based on the data;
enabling the vehicle responsive to an indication that intoxicating substance testing is not indicated, the enabling by the onboard device;
administering an intoxicating substance test to the prospective driver responsive to an indication that an intoxicating substance test is indicated, the administering by the onboard device, and if the intoxicating substance test is administered:
  enabling the vehicle responsive to the prospective driver passing the intoxicating substance test, the enabling by the onboard device; and
  disabling the vehicle responsive to the prospective driver failing the intoxicating substance test, the disabling by the onboard device.

20. The method of claim 19, further comprising, if the intoxicating substance test is administered, sending a signal to an operations center responsive to the prospective driver failing the intoxicating substance test.

21. A method comprising:
  receiving a signal that a prospective driver intends to drive a vehicle, the receiving by an onboard device coupled onboard the vehicle;
  identifying the prospective driver;
  retrieving at least one previously stored rule regarding whether to allow the identified prospective driver to drive the vehicle;
  retrieving data relevant to the rule by retrieving an aggregate driving time for the prospective driver;
  determining an indication of whether to allow the identified prospective driver to drive the vehicle by determining whether the aggregated driving time for the prospective driver over a period of time exceeds a predefined limit;
  allowing the prospective driver to operate the vehicle responsive to an indication that the prospective driver is authorized; and
  disabling the vehicle responsive to an indication that the prospective driver is not authorized to drive the vehicle.

22. The method of claim 21, wherein identifying the prospective driver further comprises identifying the prospective driver via fingerprint detection based on physical contact with a component of the vehicle.

23. A method comprising:
  receiving a signal that a prospective driver intends to drive a vehicle, the receiving by an onboard device coupled onboard the vehicle;
  identifying the prospective driver;
  retrieving at least one previously stored rule regarding whether to allow the identified prospective driver to drive the vehicle;
  retrieving data relevant to the rule by obtaining a definition of a geo-fence boundary and a current location;
  determining an indication of whether to allow the identified prospective driver to drive the vehicle by analyzing the current location relative to the geo-fence boundary;
  allowing the prospective driver to operate the vehicle responsive to an indication that the prospective driver is authorized; and
  disabling the vehicle responsive to an indication that the prospective driver is not authorized to drive the vehicle.

24. The method of claim 23, further comprising:
  wherein retrieving data relevant to the retrieved rule further comprises obtaining a current time; and
  wherein determining an indication of whether to allow the identified prospective driver to drive further comprises determining analyzing the current time relative to rule.

25. A system comprising:
  a processor;
  a memory coupled to the processor;
  wherein the memory stores a program that, when executed by the processor, causes the processor to:
    receive a signal that a prospective driver intends to drive a vehicle;
    retrieve at least one previously stored rule regarding intoxicating substance testing associated with the vehicle;
    obtain a definition of a geo-fence boundary and determine a current location;
    determine whether intoxicating substance testing is indicated by the rule by analysis of the current location relative to the geo-fence boundary;
    enable the vehicle responsive to an indication that intoxicating substance testing is not indicated;
    cause administration of an intoxicating substance test of the prospective driver responsive to an indication that an intoxicating substance test is indicated, the administration of the intoxicating substance test proximate to the vehicle, and if the intoxicating substance test is administered the program causes the processor to:
      enable the vehicle responsive to the prospective driver passing the intoxicating substance test; and
      disabling the vehicle responsive to the prospective driver failing the intoxicating substance test.

26. The system of claim 25, wherein when the processor causes administration of the intoxicating substance test, the program causes the processor to cause administration of a test indicative of blood alcohol content.

27. The system of claim 25, wherein when the processor causes administration of the intoxicating substance test, the program causes the processor to cause administration of a test indicative of opiate consumption of the prospective driver.

28. The system of claim 25, wherein when the processor causes administration of the intoxicating substance test, the program causes the processor to cause administration of a test indicative of tetrahydrocannabinol consumption of the prospective driver.

29. The system of claim 25, wherein the program further causes the processor to modify at least one previously stored rule based on at least one intoxicating substance test result.

30. A system comprising:
  a processor;
  a memory coupled to the processor;
  wherein the memory stores a program that, when executed by the processor, causes the processor to:
    receive a signal that a prospective driver intends to drive a vehicle;
    retrieve at least one previously stored rule from an operations center, the operations center remotely located from the vehicle, and the at least one previously stored rule regarding intoxicating substance testing associated with the vehicle;
    retrieve data relevant to the rule;
    determine whether intoxicating substance testing is indicated by the rule based on the data;
    enable the vehicle responsive to an indication that intoxicating substance testing is not indicated;
    cause administration of an intoxicating substance test of the prospective driver responsive to an indication that an intoxicating substance test is indicated, the administration of the intoxicating substance test proximate to the vehicle, and if the intoxicating substance test is administered program causes the processor to:
      enable the vehicle responsive to the prospective driver passing the intoxicating substance test; and
      disabling the vehicle responsive to the prospective driver failing the intoxicating substance test.

31. The system of claim 30, further comprising:
  wherein when the processor retrieves data relevant to the retrieved rule, the program causes the processor to identify the prospective driver;

wherein when the processor determines whether intoxicating substance testing is indicated, the program causes the processor to apply the rule using the identity of the prospective driver.

32. The system of claim 31, further comprising:
wherein when the processor identifies the prospective driver, the program further causes the processor to identify the prospective driver via fingerprint detection based on physical contact with a component of the vehicle; and
wherein when the processor causes administration of the intoxicating substance test, the program causes the processor to perform transdermal monitoring based on physical contact with the component of the vehicle.

33. A system comprising:
a processor;
a memory coupled to the processor;
wherein the memory stores a program that, when executed by the processor, causes the processor to:
   receive a signal that a prospective driver intends to drive a vehicle;
   retrieve at least one previously stored rule regarding intoxicating substance testing associated the vehicle;
   retrieve data from an operations center, the operations center remotely located from the vehicle, and the data relevant to the rule;
   determine whether intoxicating substance testing is indicated by the rule based on the data;
   enable the vehicle responsive to an indication that intoxicating substance testing is not indicated;
   cause administration of an intoxicating substance test of the prospective driver responsive to an indication that an intoxicating substance test is indicated, the administration of the intoxicating substance test proximate to the vehicle, and if the intoxicating substance test is administered Program causes the processor to:
      enable the vehicle responsive to the prospective driver passing the intoxicating substance test; and
      disabling the vehicle responsive to the prospective driver failing the intoxicating substance test.

34. The system of claim 33, further comprising:
wherein the program causes the processor to identify the prospective driver; and
wherein when the processor determines whether intoxicating substance testing is indicated, the program causes the processor to apply the rule using the identity of the prospective driver.

35. A system comprising:
a processor;
a memory coupled to the processor;
wherein the memory stores a program that, when executed by the processor, causes the processor to:
   receive a signal that a prospective driver intends to drive a vehicle;
   retrieve at least one previously stored rule regarding intoxicating substance testing associated the vehicle;
   retrieve data relevant to the rule;
   determine whether intoxicating substance testing is indicated by the rule based on the data, the determination by receipt of an indication from an operations center, the operations center remotely located from the vehicle;
   enable the vehicle responsive to an indication that intoxicating substance testing is not indicated;
   cause administration of an intoxicating substance test of the prospective driver responsive to an indication that an intoxicating substance test is indicated, the administration of the intoxicating substance test proximate to the vehicle, and if the intoxicating substance test is administered Program causes the processor to:
      enable the vehicle responsive to the prospective driver passing the intoxicating substance test; and
      disabling the vehicle responsive to the prospective driver failing the intoxicating substance test.

36. The system of claim 35, further comprising:
wherein when the processor retrieves data relevant to the retrieved rule, the program causes the processor to determine a current location of the vehicle; and
wherein when the processor determines whether intoxicating substance testing is indicated, the program causes the processor to apply the rule and the current location of the vehicle.

* * * * *